United States Patent Office 3,558,318

Patented Jan. 26, 1971

3,558,318

LIGHT-SENSITIVE DIAZOTYPE MATERIAL WHICH COMPRISE ARYL-SUBSTITUTED ACYLACETONITRILES OR ESTER OR AMIDE DERIVATIVES OF SAID ARYL-SUBSTITUTED ACYLACETONITRILES AS COUPLING COMPONENTS

John M. Sheehan, Springfield, Mass., assignor to Tecnifax Corporation, Holyoke, Mass., a corporation of Massachusetts No Drawing. Filed July 18, 1968, Ser. No. 745,697
Int. Cl. G03c *1/58*
U.S. Cl. 96—91 9 Claims

ABSTRACT OF THE DISCLOSURE

Light-sensitive diazotype material having coating compositions thereon, said compositions comprise at least one light-sensitive diazonium compound and an aryl-substituted acylacetonitrile, an ester derivative of such an acylacetonitrile or an amide derivative of such an acylacetonitrile as a coupling component for said diazonium compound.

BACKGROUND OF THE INVENTION

Field of the invention

This invention relates to novel, light-sensitive diazo compositions of the two component type which contain, as a yellow coupler for the light-sensitive diazonium compound, an aryl-substituted acylacetonitrile, an ester derivative of such an acylacetonitrile, or an amide derivative of such an acylacetonitrile. Diazo compositions containing these acylacetonitriles or ester or amide derivatives of such acylacetonitriles as yellow coupling components have been found to exhibit excellent shelf-life, and are less susceptible to precoupling during storage than are diazo compositions containing unsubstituted acylacetonitriles or derivatives of such unsubstituted acylacetonitriles.

DESCRIPTION OF THE PRIOR ART

It has long been known that diazonium compounds are capable of reacting with compounds such as aromatic amines, phenols, phenol ethers, compounds containing active methylene groups, and the like, to form colored reaction products known as azo dyes. This "coupling" reaction has proven to be most useful in a number of commercial applications, such as in the preparation of textile dyestuffs, and in diazo imaging systems.

Two of the most accepted types of diazo imaging processes employ a diazotype material which comprises a light-sensitive diazonium compound coated on a base or a support material; and, depending on whether or not the diazotype material is designed for use in a one-component or semi-wet development process, or a two-component or "dry" process, the layer or coating containing the light-sensitive diazonium compound may or may not also contain a coupling component for the diazonium compound.

In the case wherein the diazonium compound is present on the base material without a coupling component (i.e., in the case of a one-component or semi-wet development diazotype material), the light-sensitive diazotype material is exposed, and is then developed by applying a developing solution containing a coupling component to the exposed diazotype material. During the exposure step, the light-sensitive diazonium compound is destroyed or altered by the light striking the exposed areas, thereby making the diazonium compound unavailable for coupling with the coupling component in the development step. The subsequent treatment of the exposed diazotype material with the developing solution containing the coupling component results in the formation of an azo dye image in those areas wherein the unaltered diazonium compound is still available for coupling with the coupling component.

In the case wherein the diazonium compound is present on the base material along with a coupling component or components (i.e. in the case of a two-component or dry development diazotype material), the light-sensitive diazotype material is exposed, and is then developed by subjecting the exposed diazotype material to an alkaline atmosphere. As in the case with the one-component diazotype process, the light-sensitive diazonium compound is destroyed or altered by light in the exposed areas during the exposure step, thereby making it unavailable for coupling with the coupling component or components which are present in the diazotype material. When the exposed diazotype material is then subjected to an alkaline atmosphere, such as ammonia, the alkaline conditions permit the coupling reaction to take place between the coupling component and the unaltered diazonium compound to form the colored azo dye image.

Although the color of the azo dye image which is obtained in any given instance depends primarily on the coupling components and the diazonium compounds which are employed, coupling components are often generally described as being couplers of a given color—the color being the color of the dye which is usually obtained when the particular coupler in question couples with a diazonium compound. For example, couplers such as monohydric phenols, catechols, catechol derivatives, resorcinols, resorcinol derivatives, diketones, acetoacetic acid derivatives, acetonitriles, cyanacetylamides and the like, usually result in yellow, orange, sepia, brown, red or maroon azo dyes. Thus, couplers from such classes of materials are conveniently referred to as yellow, orange, sepia, brown, red, or maroon couplers. On the other hand, couplers such as naphthoic acid derivatives, dioxynaphthalene derivatives, pyronones, hydroxypyronones, and the like, usually result in blue or violet azo dyes, and thus are conveniently referred to as blue or violet couplers.

One group of highly useful coupling components are the yellow couplers, since the dyes obtained from these couplers usually have actinic adsorption characteristics which permit their use as the sole coupler in a diazo composition which is employed to prepare diazotype "masters" or intermediates, and since couplers from this group can often be employed as shading components when used in conjunction with another coupler or couplers. As indicated above, compounds containing active methylene groups, compounds such as acetonitriles, derivatives of acetonitriles, and the like, have been employed as yellow couplers in diazo compositions, cf. for example, U.S. Pats. 1,989,065; 2,531,004; 2,537,001 and 2,537,106); yet a number of these active-methylene types of couplers have exhibited a tendency, when employed in two-component diazo compositions, to precouple with the diazonium compound which is present in said compositions during storage even in the presence of the stabilizers which are usually employed. This tendency to precouple prior to exposure and development has limited the use of these materials somewhat, since even a slight amount of precoupling can result in the formation of an azo dye in those areas of the diazotype material which are the background or "cleared" areas of the diazotype print. In addition to this tendency to precouple, a number of these prior-art, active-methylene types of couplers also result, upon coupling, in dyes which have an undesirable reddish hue.

SUMMARY OF THE INVENTION

The present invention relates to light-sensitive diazo compositions which comprise at least one light-sensitive diazonium compound and a coupling component for said diazonium compound having the general formula:

$$R-\overset{O}{\overset{\|}{C}}-\underset{X}{\underset{|}{C}H}-Y$$

Wherein R represents a lower alkyl group containing from 1 to about 6 carbon atoms or a mononuclear aryl group; X represents a substituted or an unsubstituted aryl group, and Y represents a cyano group, a carbalkoxy group or a carbamyl group. Illustrative of the groups represented by R are groups such as methyl, ethyl, propyl, butyl, pentyl, hexyl, phenyl and the like, with methyl and phenyl being preferred. Illustrative of the groups represented by X are groups such as, phenyl, P-methoxyphenyl, P-chlorophenyl, naphthyl, and the like. The light-sensitive diazo compositions of this invention exhibit improved shelf-life stability, and the yellow couplers which are employed in the diazo compositions of this invention exhibit, upon development, a high coupling rate with the diazonium compounds employed in such compositions, with a significant reduction in the tendency to precouple. The azo dyes obtained from these couplers are yellow or yellow-green in shade.

DESCRIPTION OF THE PREFERRED EMBODIMENTS

As previously indicated, the yellow couplers employed in preparing the light-sensitive diazo compositions of this invention are compounds of the formula:

$$R-\overset{O}{\overset{\|}{C}}-\underset{X}{\underset{|}{C}H}-Y$$

Wherein R represents a lower alkyl group containing from 1 to about 6 carbon atoms or a mononuclear aryl group, X represents a substituted or an unsubstituted aryl group, and Y represents a cyano group, a carbalkoxy group or carbamyl group. Illustrative of such compounds are compounds such as α-phenylacetoacetonitrile

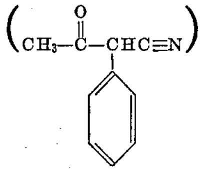

α-naphthylacetonacetonitrile

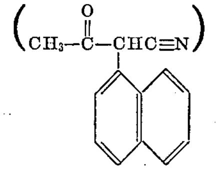

α-(p-chlorophenyl) acetoacetonitrile

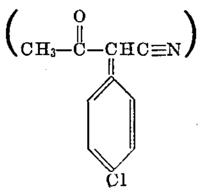

α-(p-methoxyphenyl) acetoacetonitrile

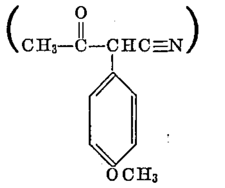

ethyl α-phenylacetoacetate

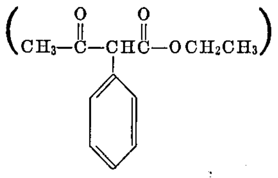

α-phenylacetoacetamide

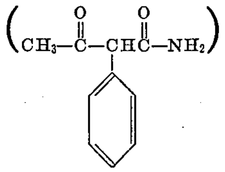

α-phenylbenzoylacetonitrile

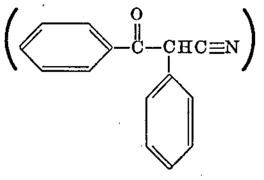

and the like

Those compounds wherein Y represents a cyano group, (i.e. the aryl-substituted acylacetonitriles) can be prepared by reacting an aralkyl cyanide or a substituted aralkyl cyanide with an ester of an aromatic or aliphatic carboxylic acid in the presence of sodium or a sodium alkoxide. The reaction can be represented by the equation:

$$X-CH_2C\equiv N + R-\overset{O}{\overset{\|}{C}}-OR' \xrightarrow[\text{or Na}]{R'ONa} R-\overset{O}{\overset{\|}{C}}-\underset{X}{\underset{|}{C}H}C\equiv N + R'OH$$

wherein R' is an alkyl group and R and X are as hereinbefore defined.

Those compounds wherein Y represents a carbalkoxy group (i.e. ester derivatives of the above-mentioned aryl-substituted acylacetonitriles) can be prepared by reacting the corresponding aryl-substituted acylacetonitrile with an alcohol in the presence of hydrogen halide to form the imido ester derivative of said acylacetonitrile, and then hydrolyzing the imido ester derivative to the ester derivative of the aryl-substituted acylacetonitrile, usually in the presence of a mineral acid. The reaction can be represented by the equations:

$$(1)\quad R-\overset{O}{\overset{\|}{C}}-\underset{X}{\underset{|}{C}H}C\equiv N+R'OH \xrightarrow{(HCl)} R-\overset{O}{\overset{\|}{C}}-\underset{X}{\underset{|}{C}H}-\underset{NH}{\underset{\|}{C}}-OR'$$

and $$(2)\quad R-\overset{O}{\overset{\|}{C}}-\underset{X}{\underset{|}{C}H}-\underset{NH}{\underset{\|}{C}}-OR'+H_2SO_4+H_2O \longrightarrow R-\overset{O}{\overset{\|}{C}}-\underset{X}{\underset{|}{C}H}-\overset{O}{\overset{\|}{C}}-OR'+NH_4HSO_4$$

wherein R, R' and X are as hereinbefore defined.

Those compounds wherein Y represents a carbamyl group (i.e. amide derivatives of the above-mentioned aryl-substituted acylacetonitriles) can be prepared by converting the corresponding acyl-substituted acylacetonitrile to the amide derivative thereof in the presence of boron trihalide and aqueous acetic acid. The reaction can be represented by the equation:

$$R\overset{O}{\overset{\|}{C}}-\underset{X}{\underset{|}{CH}}-C\equiv N+H_2O \xrightarrow[CH_3COOH]{BF_3} R-\overset{O}{\overset{\|}{C}}-\underset{X}{\underset{|}{CH}}-\overset{O}{\overset{\|}{C}}-NH_2$$

The light-sensitive diazonium compounds which can be employed in preparing the light-sensitive diazo compositions of the present invention are any of the numerous light-sensitive diazonium compounds which are available in the prior art, and the particular light-sensitive diazonium compound which is employed is not critical in the practice of this invention. Illustrative of such compounds are the stabilized salts of diazonium derivatives of a p-phenylenediamine, for example, stabilized salts of diazonium derivatives of such compounds as N-methyl-p-phenylenediamine,
N-ethyl-p-phenylenediamine,
N-hydroxyethyl-p-phenylenediamine,
N,N-dimethyl-p-phenylenediamine,
N,N-diethyl-p-phenylenediamine,
N,N-dipropyl-p-phenylenediamine,
N-methyl-N-(β-hydroxyethyl)-p-phenylenediamine,
N-ethyl-N-(β-hydroxyethyl)-p-phenylenediamine,
N-(β-hydroxyethyl)-p-phenylenediamine,
N-butyl-N-(β-hydroxyethyl)-p-phenylenediamine,
N,N-di(β-hydroxyethyl)-p-phenylenediamine,
N-benzyl-N-ethyl-p-phenylenediamine,
N-ethyl-2-methyl-4-aminoaniline,
N,N-dimethyl-2-methyl-4-aminoaniline,
N,N-dimethyl-3-methyl-4-aminoaniline,
N,N-diethyl-3-methyl-4-aminoaniline,
N-ethyl-N-(β-hydroxyethyl)-3-methyl-4-aminoaniline,
N-cyclohexyl-2-methoxy-4-aminoaniline,
N,N-di(β-hydroxyethyl)-3-methyl-4-aminoaniline,
2,5-diethoxy-4-morpholinoaniline,
2,5-dimethoxy-4-morpholinoaniline,
2,5-dibutoxy-4-morpholinoaniline,
2,5-diisopropoxy-4-morpholinoaniline,
2,5-diethoxy-4-piperidinoaniline,
2,5-dimethoxy-4-piperidinoaniline,
N-benzyl-2,5-diethoxy-4-aminoaniline,
2,6-dimethyl-4-morpholinoaniline,
2,6-diethyl-4-morpholinoaniline,
2,6-dimethyl-4-piperidinoaniline, and the like.

It should be understood that mixtures of light-sensitive diazonium compounds can be employed in the practice of the present invention without departing from the scope thereof, and that other couplers can be employed in conjunction with the yellow couplers hereinbefore described in preparing diazo compositions in accordance with the present invention without departing of the scope thereof. In addition, the light-sensitive diazo compositions of this invention can also comprise any of the additional components which are often employed in such compositions, such as stabilizers, preservatives, anti-oxidants, extenders, inhibitors, color intensifiers, and the like.

The various components of the light-sensitive diazo-compositions of this invention are usually dissolved in an organic solvent system, and the resulting solution is then coated, using conventional coating techniques, onto a suitable base support. The base supports which can be employed are any of those commonly used as support materials in the photographic and copying arts, such as paper, cloth, films and the like. Illustrative of the films which can be employed are films such as cellulose ether films, cellulose ester films (e.g. cellulose acetate and cellulose acetate butyrate) polyester films (e.g. polyethylene terephthalate), and the like. Upon drying, the base support which has been coated with a light-sensitive diazo composition of this invention results in a light-sensitive diazotype material having improved shelf-life stability. When one of the couplers which has hereinbefore been described in detail is the sole coupler present in the light-sensitive diazo composition employed to prepare such diazotype materials, these materials result, upon exposure and development, in a diazotype print having a yellow or greenish-yellow image and a clear background; and such colors are preferred over reddish-yellow shades in certain applications, such as color-proofing.

The following examples serve to further illustrate the present invention, but are not intended to limit the scope thereof in any way.

EXAMPLE 1

6.0 grams (0.26 mol) of sodium metal were added to a mixture of 23.4 grams (0.2 mol) of benzyl cyanide and 26.4 grams (0.3 mol) of ethyl acetate. The initial temperature of the resulting reaction mixture was 26° C. After one hour of standing, the temperature of the reaction mixture had risen to 65° C., and the entire reaction mixture had solidified. At this point, an additional 25 cc. of ethyl acetate were added; and, after another hour of standing, the temperature of the reaction mixture was 30° C. Another 25 cc. of ethyl acetate were added to the reaction mixture, and the mixture was then allowed to stand overnight. 10 cc. of ethanol were added to the reaction mixture the next morning, to remove any excess of free sodium which may have been present; and the solids in the mixture were then filtered off. The solids were washed with ethyl acetate and dissolved in 230 cc. of water. The resulting solution was then acidified with acetic acid to yield 21 grams (66% yield) of α-phenylacetoacetonitrile. The white solid product which was obtained had a melting point of from 86° to 90° C.

EXAMPLE 2

6.0 grams (0.26 mol) of sodium pellets were added to a mixture of 33.4 grams (0.2 mol) of naphthylacetonitrile and 26.4 grams (0.3 mol) (29 cc.) of ethyl acetate. The resulting reaction was then brought to reflux temperature and allowed to reflux for ½ hour, at which time solids precipitated. An additional 100 cc. of ethyl acetate were added to facilitate stirring, along with 10 cc. of ethanol. After standing overnight, the solids were filtered from the reaction mixture and washed with ethyl acetate. The washed solids were then dissolved in water. The resulting solution was cooled to 0° C. and then acidified with acetic acid. An oil separated from the solution, and was extracted with ether. The ether layer was dried with sodium sulfate, and the ether was removed by flash distillation to yield 11.4 grams of α-naphthylacetoacetonitrile.

EXAMPLE 3

6.0 grams (0.26 mol) of sodium metal were added, with vigorous stirring, to a mixture of 30.2 grams (0.2 mol) of p-chlorophenylacetonitrile and 26.4 grams (0.3 mol) of freshly dried and distilled ethyl acetate. An additional 13.2 grams (0.15 mol) of ethyl acetate were then added to facilitate stirring, and the resulting reaction mixture was allowed to stand over a weekend. The solids in the reaction mixture were then filtered off and washed with ether. The washed solids were dissolved in water and the resulting solution was then acidified with acetic acid to yield 19 grams of α-(p-chlorophenyl)acetoacetonitrile. The solid product which was obtained had a melting point of from 121° to 125° C.

EXAMPLE 4

6.0 grams of sodium metal were added to mixture of 29.4 grams of p-methoxyphenylacetonitrile and 39.6 grams of freshly dried and distilled ethyl acetate, and solids precipitated from the resulting reaction mixture. An additional 20 cc. of ethyl acetate were added, and the reaction mixture was allowed to stand over a weekend. The solids in the reaction mixture were then filtered off and washed with 230 cc. of ether. The washed solids were dissolved in 325 cc. of water and the resulting solution was acidified with 22.5 cc. of glacial acetic acid to yield 49 grams of α-(p-methoxyphenyl)acetoacetonitrile. The solid product which was obtained had a melting point of 66° to 69° C.

EXAMPLE 5

30 grams of sodium pellets in 500 cc. of ethanol were added to a mixture of 117 grams (1 mol) of benzyl cyanide and 225 grams (1.5 mol) of ethyl benzoate. The resulting reaction mixture was allowed to stand over the weekend. A precipitate had formed upon standing, and the solids which had formed were filtered and washed with ether. The washed solids were dissolved in water, and filter aid was added to the resulting solution. After filtering, the solution was acidified with acetic acid, and 65 grams of the solid which precipitated upon acidification were recovered upon filtration. This solid was redissolved in 200 cc. of an aqueous solution containing 10% by weight of sodium hydroxide, and the resulting solution was then acidified with acetic acid. The solid which precipitated was filtered off, washed with water, and dried to yield 43 grams of α-phenylbenzoylacetonitrile. The product which was obtained had a melting point of 108° to 115° C.

EXAMPLE 6

161 grams (1 mol) of α-phenylacetoacetonitrile were added to 400 cc. of ethanol, and the resulting mixture was warmed until all of the α-phenylacetoacetonitrile dissolved. The solution was cooled to −10° C., at which point a solid precipitate was formed. The reaction mixture was saturated with hydrogen chloride gas for 6 hours and allowed to stand overnight. The reaction mixture was then cooled again to −10° C., and hydrogen chloride gas was bubbled through the reaction mixture for an hour. The reaction mixture was warmed to 40° C., and the hydrogen chloride was removed by applying a vacuum for ½ hour. After this removal of hydrogen chloride by vacuum, the reaction mixture was poured into a mixture of a solution of 200 grams of sodium carbonate in 1200 cc. of water and 2000 grams of cracked ice. The resulting mixture was extracted with three 500 cc. portions of ether. Each of the ether extracts were washed with four 250 cc. portions of an ice-cold 5% sodium chloride solution, and then the washed ether extracts were combined in a flask resting in an ice bath. 1500 grams of ice were added to a solution of 100 grams of concentrated sulfuric acid in 700 cc. of water, and the resulting mixture was stirred until ice formed on the outside of the beaker containing the mixture. One-half of the mixture was added to the ether extracts, using a funnel to remove the ice; and then the ether extracts containing the cold sulfuric acid solution were shaken for 15 seconds. The layers in the resulting mixture were separated, and the remaining cold sulfuric acid solution was added to the ether layer. As before, the ether-aqueous sulfuric acid mixture was shaken for 15 seconds and then the layers in the mixture were separated. The two aqueous layers were combined, and the combined mixture turned cloudy immediately.

The mixture was heated on a steam bath for ½ hour, at which time the temperature of the mixture had reached 50° C. The mixture was then cooled and extracted with 230 cc. of ether. The ether layer was washed with 100 cc. of water, and the water layer, after separation, was recombined with the aqueous sulfuric acid layer which had been extracted with the 230 cc. of ether. The combined mixture was then heated on a steam bath for 45 minutes (80° to 90° C.), cooled, and again extracted with ether (250 cc.). All of the ether extracts were combined and washed with a solution prepared by diluting 250 cc. of an aqueous solution of 5% sodium bicarbonate with 250 cc. water. After separation, the ether layer was dried over a weekend over sodium sulfate. After drying, the ether was removed by flash distillation to yield 163 grams of an oil product. This oil product was then distilled to yield 121 grams of ethyl α-phenylacetoacetate, which had a boiling point of 90° to 105° C. at 1 mm. of mercury.

EXAMPLE 7

30 grams of α-phenylacetoacetonitrile were added to a solution of 300 cc. of acetic acid in 40 cc. of water, and the resulting mixture was saturated with $BF_3$ gas until white fumes were evolved. The temperature of the reaction mixture rose to 120° C. and a clear orange solution was obtained. This solution was cooled and then neutralized with a 6 N sodium hydroxide solution, at which time a small amount of solids formed. The mixture was refluxed for about 45 minutes without removing the solids which had formed, and the clear solution which was obtained upon refluxing was filtered while hot. The filtrate was poured over ice, at which time a white solid formed. The mixture was filtered, and the solids were dried over phosphorous pentoxide to yield 12 grams of α-phenylacetoacetamide, which had a melting point of 79° to 85° C.

EXAMPLES 8 TO 16

Using the products prepared in the previous examples as coupling components, a number of light-sensitive diazo formulations were prepared, having the following compositions:

| Component | Formulation (example number) | | | | | | | | |
|---|---|---|---|---|---|---|---|---|---|
| | 8 | 9 | 10 | 11 | 12 | 13 | 14 | 15 | 16 |
| Acetone, cc | 80 | 80 | 80 | 80 | 80 | 80 | 80 | 80 | 8 8 |
| Methanol, cc | 20 | 20 | 20 | 20 | 20 | 20 | 20 | 20 | 52 |
| Methyl ethyl ketone, cc | | | | | | | | | 10 |
| Hexafluorophosphoric acid, cc | 0.7 | 0.7 | 0.7 | 0.7 | 0.7 | 0.7 | 0.7 | 0.7 | |
| Sulfosalicylic acid, gm | 1.75 | 1.75 | 1.75 | 1.75 | 1.75 | 1.75 | 1.75 | 1.75 | 1.75 |
| Thiourea, gm | 0.3 | 0.3 | 0.3 | 0.3 | 0.3 | 0.3 | 0.3 | 0.3 | |
| Zinc chloride, gm | | | | | | | | | 0.5 |
| α-Phenylacetoacetonitrile (Example 1), gm | 1.45 | | | | | | | 1.45 | |
| α-Naphthylacetoacetonitrile (Example 2), gm | | 1.90 | | | | | | | 1.9 |
| α-(p-Chlorophenyl)acetoacetonitrile (Example 3), gm | | | 1.75 | | | | | | |
| α-(p-Methoxyphenyl)acetoacetonitrile (Example 4), gm | | | | 1.72 | | | | | |
| α-Phenylbenzoylacetonitrile (Example 5), gm | | | | | 2.0 | | | | |
| Ethyl α-phenylacetoacetate (Example 6), gm | | | | | | 1.87 | | | |
| α-Phenylacetoacetamide (Example 7), gm | | | | | | | 1.48 | | |
| 3-methyl-4-(N-ethylamino)benzenediazoniumhexafluorophosphate, gm | 0.8 | 0.8 | 0.8 | 0.8 | 0.8 | 0.8 | 0.8 | | |
| 3-methyl-4-(N-ethylamino)benzenediazoniumchloride, ½ $Zm_nCl_2$ salt, gm | | | | | | | | | 0.7 |
| 3-methoxy-4-anilinobenzenediazoniumhexafluorophosphate, gm | | | | | | | | 0.96 | |

Each of formulations 8 through 15 were coated onto separate sheets of cellulose triacetate film and dried. Formulation 16 was coated onto a sheet of cellulose diacetate film and dried. Samples of these coated films were then exposed under an appropriate partially-opaqued original and developed in ammonia vapor. All of the resulting diazotype prints had a yellow image on a clear background.

Other samples of the films were tested for shelf-life stability by placing prepared packages of these samples in an oven at 135° F. for three days, along with prepared packages of two control samples which were prepared from similar formulations, except that the couplers which were employed in the formulations were acetoacetanilide and acetoacetobenzylamine respectively. When the films which were prepared from formulations 8 through 16 were removed from the oven after three days, they exhibited no discoloration; and, after exposure and development, these films produced diazotype prints having a yellow image on a clear background. The two control samples, on the other hand, exhibited severe background discoloration after similar treatment.

What is claimed is:

1. A light-sensitive diazotype material which comprises a base support having a coating thereon which comprises at least one light-sensitive diazonium compound, an acidic stabilizer and a yellow coupling component for said diazonium compound having the general formula:

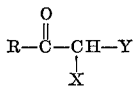

wherein R represents a lower alkyl group containing from 1 to about 6 carbon atoms or a mononuclear aryl group, X represents an aryl group, and Y represents a cyano group, a carbalkoxy group or a carbamyl group.

2. A light-sensitive diazotype material as claimed in claim 1 wherein R is methyl or phenyl and X is a group selected from the class consisting of phenyl, naphthyl, p-chlorophenyl and p-methoxyphenyl.

3. A light-sensitive diazotype material as claimed in claim 2 wherein the coupling component is a compound having the structural formula:

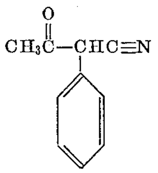

4. A light-sensitive diazotype material as claimed in claim 2 wherein the coupling component is a compound having the structural formula:

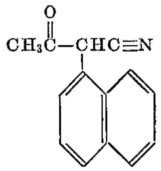

5. A light-sensitive diazotype material as claimed in claim 2 wherein the coupling component is a compound having the structural formula:

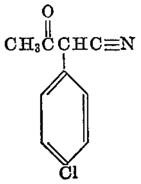

6. A light-sensitive diazotype material as claimed in claim 2 wherein the coupling component is a compound having the structural formula:

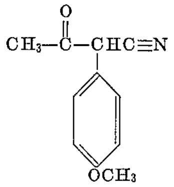

7. A light-sensitive diazotype material as claimed in claim 2 wherein the coupling component is a compound having the structural formula:

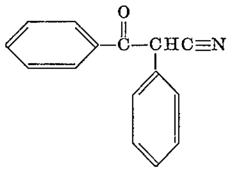

8. A light-sensitive diazotype material as claimed in claim 2 wherein the coupling component is a compound having the structural formula:

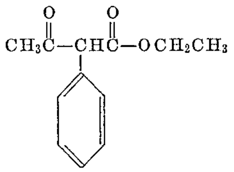

9. A light-sensitive diazotype material as claimed in claim 2 wherein the coupling component is a compound having the structural formula:

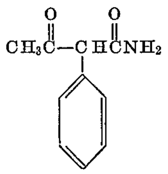

References Cited

UNITED STATES PATENTS

| | | | |
|---|---|---|---|
| 1,989,065 | 1/1935 | Schmidt et al. | 96—91X |
| 2,531,004 | 11/1950 | Slifkin | 96—91X |
| 2,533,185 | 12/1950 | Unkauf | 96—91 |
| 2,552,355 | 5/1951 | Von Glahn et al. | 96—91 |
| 2,693,484 | 11/1954 | Cummings et al. | 260—193X |
| 3,077,403 | 2/1963 | Trucker | 96—100 |
| 3,249,598 | 5/1966 | Resnick et al. | 260—193X |
| 3,415,652 | 12/1968 | Porter | 96—100 |

FOREIGN PATENTS

| | | | |
|---|---|---|---|
| 937,510 | 9/1963 | Great Britain | 96—91 |

NORMAN G. TORCHIN, Primary Examiner

C. L. BOWERS, Jr., Assistant Examiner

U.S. Cl. X.R.

96—49; 260—193, 483